United States Patent
Min

(10) Patent No.: US 6,826,959 B2
(45) Date of Patent: Dec. 7, 2004

(54) METHOD AND APPARATUS FOR MEASURING AN AMOUNT OF DISC UNBALANCE

(75) Inventor: Kyoung-seo Min, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/632,800

(22) Filed: Aug. 4, 2003

(65) Prior Publication Data

US 2004/0074298 A1 Apr. 22, 2004

(30) Foreign Application Priority Data

Oct. 18, 2002 (KR) ................................ 10-2002-0063848

(51) Int. Cl.[7] .......................... G01M 1/16; G11B 19/20; G11B 33/10
(52) U.S. Cl. .......................... 73/462; 73/460; 369/53.41
(58) Field of Search ............................ 73/66, 460, 462; 369/53.12–53.14, 53.18, 53.2, 53.41

(56) References Cited

U.S. PATENT DOCUMENTS

| | | | | |
|---|---|---|---|---|
| 4,423,632 A | * | 1/1984 | Madden et al. ............... 73/462 |
| 4,435,982 A | * | 3/1984 | Borner et al. ................. 73/462 |
| 4,868,762 A | * | 9/1989 | Grim et al. ................. 700/279 |
| 5,307,279 A | * | 4/1994 | Christian et al. ........... 701/124 |
| 5,805,464 A | * | 9/1998 | Cameron et al. ........... 700/279 |
| 2002/0000121 A1 | * | 1/2002 | Carter et al. ................. 73/459 |

* cited by examiner

*Primary Examiner*—Hezron Williams
*Assistant Examiner*—John C Hanley
(74) *Attorney, Agent, or Firm*—Staas & Halsey LLP

(57) ABSTRACT

A method and apparatus accurately measuring the amount of unbalance of a disc, based on the time to reach a target RPM (Rotation Per Minute) regardless of an assembly condition of a disc drive. The method includes: storing a plurality of reference disc unbalance values; measuring an RPM (Rotation Per Minute) of the disc; comparing the measured RPM with a target RPM; and when the measured RPM reaches the target RPM, detecting a reference disc unbalance value among the plurality of reference disc unbalance values based on an elapsed time to reach the target RPM. Accordingly, the amount of disc imbalance of the disc can be constantly measured regardless of an assembly condition of the disc drive and the computer.

29 Claims, 3 Drawing Sheets

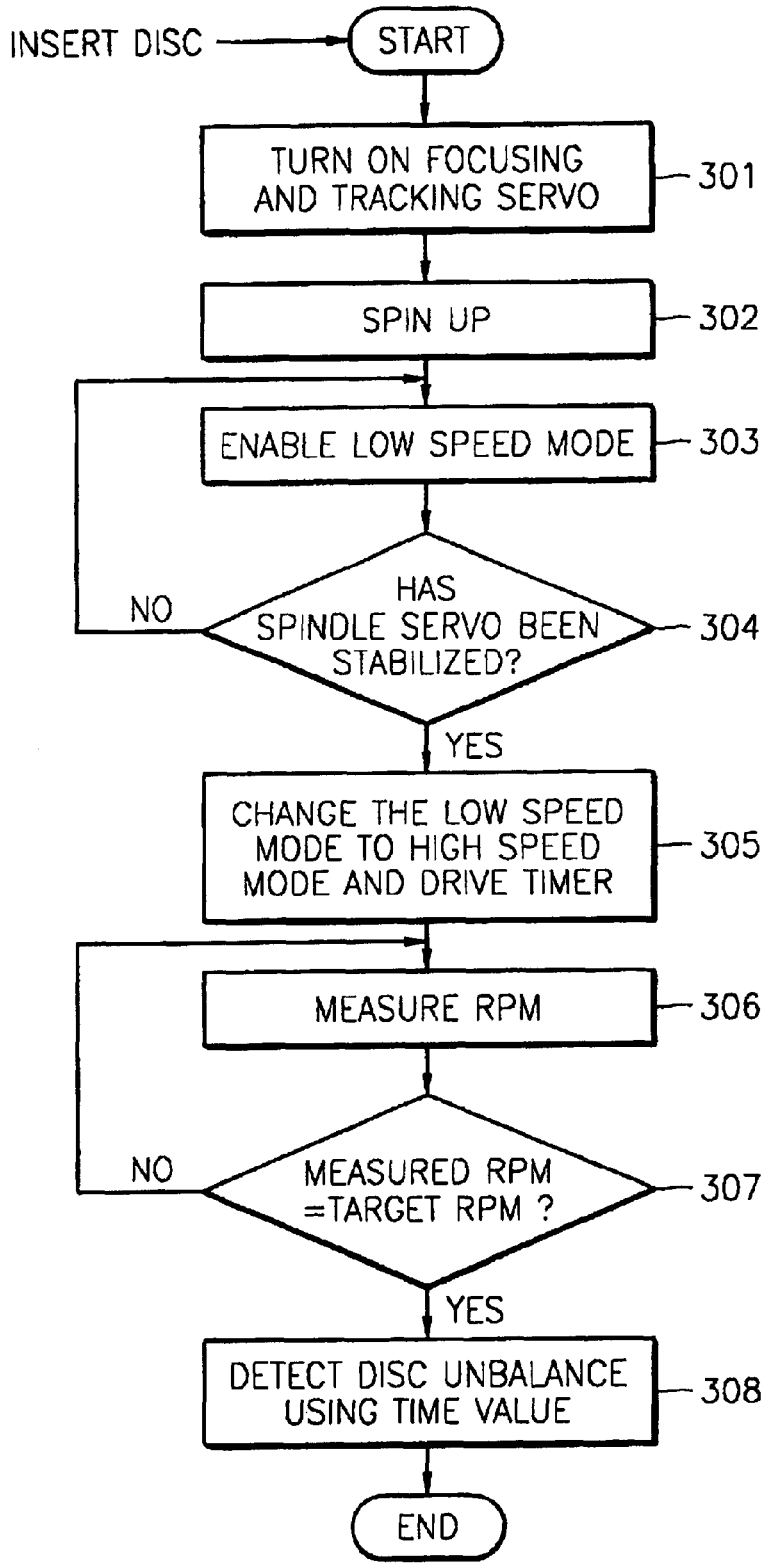

METHOD AND APPARATUS FOR MEASURING AN AMOUNT OF DISC UNBALANCE

CROSS-REFERENCE TO RELATED APPLICATIONS

This application claims the priority of Korean Patent Application No. 2002-63848, filed on Oct. 18, 2002, in the Korean Intellectual Property Office, the disclosure of which is incorporated herein in its entirety by reference.

BACKGROUND OF THE INVENTION

1. Field of the Invention

The present invention relates to a method and apparatus for accurately measuring an amount of disc unbalance in a disc drive.

2. Description of the Related Art

Noise and vibration problems in a disc drive become more serious as the speed of the disc drive increases. Particularly, an unbalanced disc causes very serious noise and vibrations. The main cause of disc unbalance is an uneven distribution of mass around the disc due to thickness variations of the disc resulting from the molding process, offset of the center hole of the disc, or disc damage, etc. In order to remove or reduce the noise and vibrations in a disc drive, particularly, due to an unbalanced disc, the amount of disc unbalance should be measured.

A conventional method of measuring disc unbalance includes rotating the disc at a predetermined low speed; measuring a first eccentricity value of the disc after a spindle servo is stabilized at the predetermined low speed; rotating the disc at a predetermined high speed to maximize vibrations; measuring a second eccentricity value of the disc after the spindle servo is stabilized at the predetermined high speed; and detecting the amount of disc imbalance by calculating the absolute value of a difference between the first eccentricity value and the second eccentricity value. Since the speed of a disc drive varies with the amount of disc unbalance and the eccentricity value of the disc varies with the speed of the disc drive, the amount of disc unbalance is detected using the eccentricity values of the disc.

However, in the conventional method described above, the amount of disc unbalance may be measured differently according to an assembly condition of a disc drive. That is, when a disc drive is rigidly assembled, vibrations of the disc drive are more effectively suppressed and, accordingly, the eccentricity of a disc measured at that time is smaller than that measured when the disc drive is loosely assembled.

SUMMARY OF THE INVENTION

The present invention provides a method and apparatus accurately measuring an amount of disc unbalance regardless of an assembly condition of a disc drive.

The present invention also provides a method and apparatus measuring the amount of disc unbalance based on a time to reach a target RPM (Rotation Per Minute).

According to an aspect of the present invention, a method of measuring disc unbalance includes storing a plurality of reference disc unbalance values; measuring an RPM (Rotation Per Minute) of the disc; comparing the measured RPM with a target RPM; and when the measured RPM reaches the target RPM, detecting a reference disc unbalance value among the plurality of reference disc unbalance values based on an elapsed time to reach the target RPM.

According to another aspect of the present invention, a method of measuring disc unbalance includes measuring an RPM (Rotation Per Minute) of the disc when the disc is controlled to change its rotation speed from a predetermined low speed to a predetermined high speed; comparing the measured RPM with a target RPM; and when the measured RPM reaches the target RPM, detecting the amount of disc imbalance amount based on a time elapsed during the time that the rotation speed of the disc is changed from the predetermined low speed to the predetermined high speed to the time when the target RPM has been reached.

According to still another aspect of the present invention, the method further includes storing a plurality of reference disc unbalance values, and the amount of disc unbalance is found by detecting a reference disc unbalance among the plurality of reference disc unbalance values based on the elapsed time.

Further, in the method according to another aspect of the present invention, the measurement of the RPM of the disc may be performed regardless of a stabilized condition of a spindle servo of the disc drive.

According to another aspect of the present invention, an apparatus measuring disc unbalance includes a spindle motor rotating the disc; a first memory storing a target RPM (Rotation Per Minute); a second memory storing a plurality of reference disc unbalance values based on a time to reach the target RPM; and a system controller measuring a time to reach the target RPM after the spindle motor begins rotating and detecting a reference disc unbalance value from the second memory based on the measured time.

According to still another aspect of the present invention, an apparatus measuring disc unbalance includes a spindle motor rotating the disc; a motor driving unit driving the spindle motor; a first memory storing a target RPM (Rotation Per Minute); a second memory storing a plurality of reference disc unbalance values based on the time to reach the target RPM; and a system controller measuring an RPM of the spindle motor when the spindle motor is controlled to change from a predetermined low speed mode to a predetermined high speed mode and detecting, from the second memory, a reference disc unbalance value corresponding to the time elapsed to reach the target RPM after the spindle motor is controlled to change from the predetermined low speed mode to the predetermined high speed mode.

The system controller may measure the RPM in the predetermined high speed mode regardless of a stabilized condition of a spindle motor of the disc drive.

Further, the system controller may drive a timer to measure the elapsed time when the spindle motor is controlled to change from the predetermined low speed mode to the predetermined high speed mode.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing embodiments thereof with reference to the attached drawings in which:

FIG. 3 is a flowchart of a method of measuring an amount of disc unbalance according to the present invention.

DETAILED DESCRIPTION OF THE INVENTION

Figure 1:
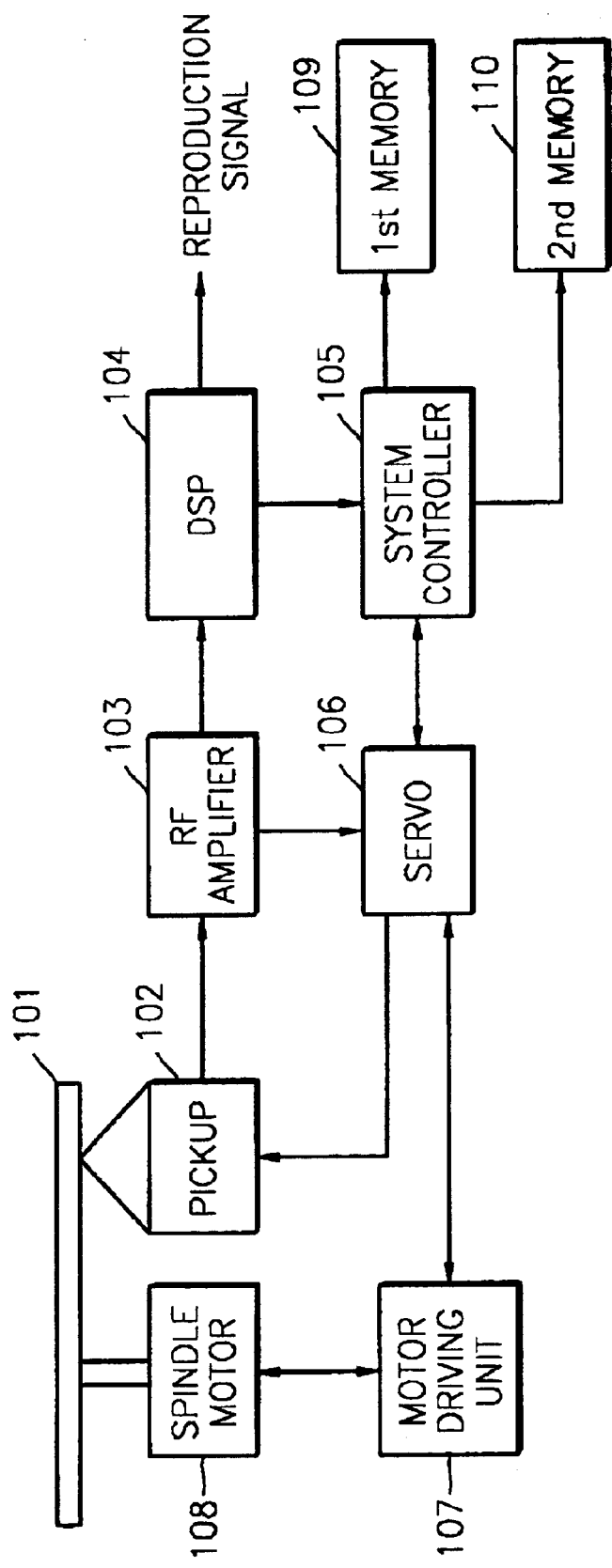
FIG. 1 is a block diagram of a disc drive including an apparatus measuring disc unbalance according to the present invention.

Embodiments of the present invention will now be described in detail with reference to the attached drawings, wherein like reference numerals refer to like elements throughout.

FIG. 1 is a block diagram of a disc drive including an apparatus measuring disc unbalance according to an embodiment of the present invention. Referring to FIG. 1, the disc drive utilizes a disc 101 and includes a pickup 102, a radio frequency (RF) amplifier 103, a digital signal processor (DSP) 104, a system controller 105, a servo 106, a motor driving unit 107, a spindle motor 108, a first memory 109, and a second memory 110.

The disc 101 is an optical recording medium, such as a CD (compact disc) or a DVD (Digital Versatile Disc), to and from which data can be recorded and/or reproduced.

When the disc drive is operated, the pickup 102 detects optical signals from the disc 101, converts the detected optical signals to electrical RF signals, and outputs the converted RF signals.

The RF amplifier 103 amplifies the RF signals transmitted from the pickup 102 to predetermined amplitudes and outputs rectified signals.

The DSP 104 detects synchronization signals of reproducing signals and a data rate, etc., based on the RF signals transmitted from the RF amplifier 103 and outputs decoded RF signals.

The system controller 105 controls overall operations of the disc drive. If the disc 101 is inserted in the disc drive, the system controller 105 controls the servo 106 to turn on and spin up a tracking servo and a focusing servo in a conventional way so that the pickup can output the RF signals.

Further, whether a spindle servo is stabilized is detected on the basis of a data rate of the RF signals transmitted from the DSP 104. If the spindle servo is stabilized, the system controller 105 controls the spindle motor 108 to rotate at a predetermined low speed. The detection whether the spindle servo is stabilized can be implemented using any of existing well-known methods.

Thereafter, the system controller 105 controls the spindle motor 108 to rotate at a predetermined high speed and drives a timer. The timer measures an elapsed time beginning when the time the rotation speed of the spindle motor 108 is changed from the predetermined low speed to the predetermined high speed and ending when a target RPM has been reached. The predetermined high speed can be set lower than the available highest speed of the disc drive.

Figure 2:
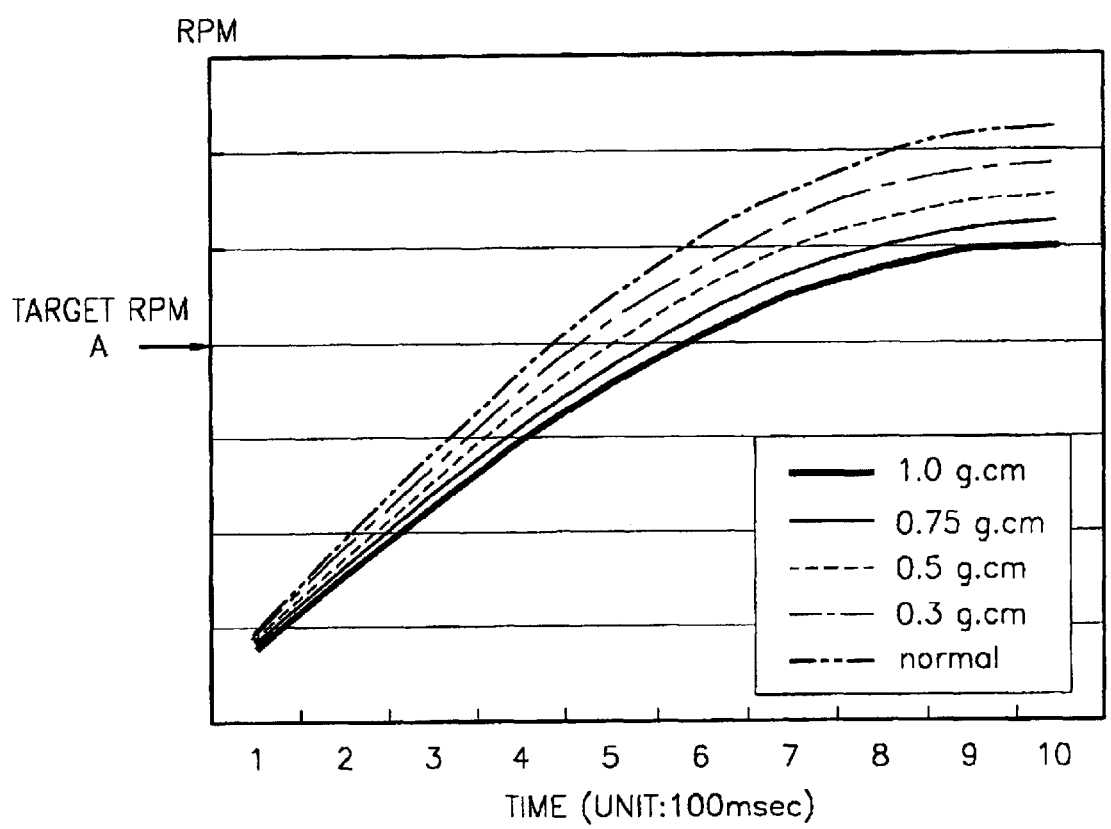
FIG. 2 is a graph showing the relationships between disc unbalance and an RPM of the disc.

The target RPM is determined to minimize the vibrations occurring in the disc drive regardless of the amount of disc unbalance. That is, as shown in FIG. 2, the rise time of the RPM varies with the amount of disc unbalance. If RPM "A" in FIG. 2 is the value just before vibrations occur in the disc drive due to the amount of disc imbalance, the RPM "A" is determined as the target RPM. The target RPM is stored in the first memory 109.

Accordingly, after the rotation speed of the spindle motor 108 is controlled to change from the predetermined low speed to the predetermined high speed, the system controller 105 measures the RPM by counting FG (Frequency Generator) pulses provided from the servo 106. A method of measuring the RPM using the FG pulses is well known to those of ordinary skill in the art.

The system controller 105 compares the measured RPM with the target RPM read from the first memory 109. If the measured RPM is different from the target RPM, the system controller 105 continuously measures the RPM. If the measured RPM corresponds to the target RPM, the system controller 105 detects a corresponding amount of unbalance of the disc from the second memory 110 based on the time value counted via the timer.

The second memory 110 stores a plurality of reference disc unbalance values corresponding to a plurality of time values. The plurality of time values is determined for a plurality of discs having different disc unbalance values on the basis of the elapsed time from the time when the rotation speed of the spindle motor 108 is changed from the predetermined low speed to the predetermined high speed to the time when the target RPM is reached. The variation amount of the RPM according to the unbalance of a disc can be understood from FIG. 2. That is, as the unbalance of a disc is greater, the time to reach the target RPM becomes longer and as the unbalance of a disc is smaller, the time to reach the target RPM becomes shorter.

As described above, since the system controller 105 detects the amount of disc imbalance using the RPM regardless of the stabilization condition of the spindle servo after controlling the rotation speed from the predetermined low speed to the predetermined high speed, the amount of disc imbalance can be measured before the spindle servo is stabilized. Accordingly, a lead-in time can be reduced in comparison with a conventional disc drive.

The servo 106 drives and controls the pickup 102 in a conventional way using a control signal provided from the system controller 105 and tracking error (TE) and focusing error (FE) signals provided from the RF amplifier 103 so that the motor driving unit 107 and the spindle motor 108 can be driven.

The motor driving unit 107 is controlled by the servo 106 to drive the spindle motor 108 in a conventional way. Further, the motor driving unit 107 transmits FG pulses generated when the spindle motor 108 is driven to the servo 106. The servo 106 transmits the FG pulses to the system controller 105.

FIG. 3 is a flowchart of a method of measuring an amount of disc unbalance according to the present invention.

When a disc is inserted in a disc drive, focusing and tracking servos are turned on in a conventional way (operation 301) and a spin-up control for the spindle motor 108 is performed (operation 302). Then, RF signals are produced from the pickup 102.

While the RF signals are produced from the pickup 102, the system controller 105 controls a predetermined low speed mode to measure disc unbalance (operation 303). Then, the servo 106 controls the rotation of the spindle motor 108 via the motor driving unit 107.

Thereafter, the system controller 105 determines whether a spindle servo is stabilized in the predetermined low speed mode controlled in operation 303 based on a data rate output from the DSP 104 (operation 304). In operation 304, if the spindle motor 108 is not stabilized, the system controller 105 waits until the spindle motor 108 is stabilized.

In operation 304, once the spindle servo is stabilized, the system controller 105 changes the predetermined low speed mode to the predetermined high speed mode and drives the timer (operation 305). Thereafter, the system controller 105 measures an RPM using FG pulses transmitted from the servo 105 (operation 306).

Thereafter, the system controller 105 compares the measured RPM with a target RPM (operation 307). If the measured RPM is different from the target RPM, the process returns to operation 306 and the measurement of the RPM and the comparison with the target RPM are repeated. However, if the measured RPM corresponds to the target RPM, the system controller 105 detects a corresponding disc unbalance value from the second memory 110 based on the time value measured by the timer (operation 308) and finishes the measurement of the amount of disc imbalance.

As described above, according to the present invention, disc unbalance can be constantly measured regardless of an assembly condition of a disc drive. Further, since the unbalance of a disc can be detected during a transition period from a low speed to a high speed, a lead-in time of a disc drive can be reduced.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A method of measuring an amount of disc imbalance of an optical disc, comprising:
   increasing a disc speed;
   measuring a time to reach a target speed while the disc speed increases; and
   matching the time to reach the target speed to the amount of disc imbalance.

2. The method of claim 1, wherein the increasing the disc speed comprises:
   increasing the disc speed from a low speed to a high speed.

3. The method of claim 2, further comprising:
   determining whether the disc speed is stabilized at the low speed;
   wherein the increasing the disc speed comprises increasing the disc speed only if the low speed is stabilized.

4. The method of claim 1, wherein the measuring the time comprises:
   activating a timer.

5. The method of claim 1, further comprising:
   selecting the target speed to minimize vibrations occurring in the disc drive regardless of the amount of disc imbalance.

6. The method of claim 1, further comprising:
   detecting the optical disc inserted in the disc drive; and
   activating focus and tracking servos if the optical disc is detected.

7. The method of claim 1, further comprising:
   storing in a memory a plurality of rise time curves that correlate a time to reach the target speed to the amount of the disc imbalance; and
   wherein the matching the time to reach the target speed to the amount of disc imbalance comprises accessing the stored plurality of rise time curves to select a rise time curve corresponding to the amount of the disc imbalance.

8. The method of claim 1, wherein the measuring the time to reach the target speed comprises:
   measuring the time to reach the target speed regardless of whether a spindle servo is stabilized to thereby reduce a lead-in time.

9. The method of claim 1, further comprising:
   activating focusing and tracking servos; and
   performing a spin-up control of a spindle motor.

10. The method of claim 1, further comprising:
    measuring the disc speed during the increasing the disc speed.

11. The method of claim 10, further comprising:
    comparing the measured disc speed to the target speed;
    wherein the measuring the disc speed continues until the measured disc speed is equal to the target speed.

12. The method of claim 1, further comprising:
    determining a plurality of time values for a plurality of discs having different disc unbalance values on the basis of the elapsed time to reach the target RPM.

13. A method of measuring an amount of unbalance of a disc, comprising:
    storing a plurality of reference disc unbalance values;
    measuring an RPM (Rotation Per Minute) of the disc;
    comparing the measured RPM with a target RPM; and
    when the measured RPM reaches the target RPM, detecting a reference disc unbalance value from the plurality of reference disc unbalance values based on an elapsed time to reach the target RPM.

14. A method of measuring the amount of unbalance of a disc, comprising:
    measuring an RPM of the disc when the disc is controlled to change a rotation speed thereof from a predetermined low speed to a predetermined high speed;
    comparing the measured RPM with a target RPM; and
    when the measured RPM reaches the target RPM, detecting disc unbalance based on a time elapsed to reach the target RPM beginning from the time when the rotation speed of the disc is changed from the predetermined low speed to the predetermined high speed.

15. The method of claim 14, further comprising an operation of storing a plurality of reference disc unbalance values, wherein the detection of the amount of disc imbalance is performed by detecting a reference disc unbalance value among the plurality of reference disc unbalance values based on the elapsed time.

16. The method of claim 14, wherein the measurement of the RPM of the disc is performed regardless of a stabilized condition of a spindle servo of the disc drive.

17. An apparatus measuring the imbalance of an optical disc, comprising:
    a system controller that increases an RPM of the optical disc, measures the time of the optical disc to reach a target RPM, and correlates the time to reach the target RPM to a disc imbalance value.

18. The apparatus of claim 17, further comprising:
    a pickup that detects optical signals from the disc, converts the detected optical signals to electrical RF signals, and outputs the converted RF signals.

19. The apparatus of claim 18, further comprising:
    a radio frequency (RF) amplifier that amplifies the converted RF signals transmitted to predetermined amplitudes and outputs rectified signals.

20. The apparatus of claim 17, further comprising:
    a digital signal processor (DSP) that detects synchronization signals of reproducing signals and outputs decoded RF signals.

21. The apparatus of claim 17, further comprising:
    a servo that turns on and spins up a tracking servo and a focusing servo; and
    a pickup that outputs RF signals from the optical disc when the servo turns on and spins up the tracking servo and the focusing servo.

22. The apparatus of claim 21, further comprising:
a motor driving unit that is controlled by the servo to drive a spindle motor.

23. The apparatus of claim 17, wherein the optical disc comprises a compact disc.

24. The apparatus of claim 17, wherein the optical disc comprises a Digital Versatile Disc to and from which data is recorded and/or reproduced.

25. An apparatus measuring the unbalance of a disc, comprising:
a spindle motor rotating the disc;
a memory storing a target RPM and a plurality of reference disc unbalance values based on a time to reach the target RPM; and
a system controller measuring a time to reach the target RPM after the spindle motor begins rotating and detecting a reference disc unbalance value from the memory based on the measured time.

26. An apparatus measuring the amount of unbalance of a disc, comprising:
a spindle motor rotating the disc;
a motor driving unit driving the spindle motor;
a memory storing a target RPM and a plurality of reference disc unbalance values based on the time to reach the target RPM; and
a system controller measuring an RPM of the spindle motor when the spindle motor is controlled to change from a predetermined low speed mode to a predetermined high speed mode and detecting, from the memory, a reference disc unbalance value corresponding to the time to reach the target RPM beginning when the spindle motor is controlled to change from the predetermined low speed mode to the predetermined high speed mode.

27. The apparatus of claim 26, wherein the system controller measures the RPM during the time to change from the predetermined low speed mode to the predetermined high speed mode regardless of a stabilized condition of a spindle motor of the disc drive.

28. The apparatus of claim 26, wherein the system controller drives a timer to measure the elapsed time when the spindle motor is controlled to change from the predetermined low speed mode to the predetermined high speed mode.

29. The apparatus of claim 26, wherein the memory comprises:
a first memory storing the target RPM;
a second memory storing the plurality of reference disc unbalance values based on the time to reach the target RPM.

* * * * *